US012665633B2

(12) United States Patent
Cao et al.

(10) Patent No.: US 12,665,633 B2
(45) Date of Patent: Jun. 23, 2026

(54) UPLINK MIMO COHERENCE CONFIGURABLE WIRELESS APPARATUS

(71) Applicant: QUALCOMM Incorporated, San Diego, CA (US)

(72) Inventors: Yiqing Cao, Beijing (CN); Peter Gaal, San Diego, CA (US); Masato Kitazoe, Hachiouji (JP); Yi Huang, San Diego, CA (US); Gokul Sridharan, Sunnyvale, CA (US); Alberto Rico Alvarino, San Diego, CA (US); Bin Han, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 18/291,205

(22) PCT Filed: Oct. 2, 2021

(86) PCT No.: PCT/CN2021/122501
§ 371 (c)(1),
(2) Date: Jan. 22, 2024

(87) PCT Pub. No.: WO2023/050456
PCT Pub. Date: Apr. 6, 2023

(65) Prior Publication Data
US 2024/0364390 A1 Oct. 31, 2024

(51) Int. Cl.
*H04B 7/0413* (2017.01)
*H04B 7/0404* (2017.01)

(52) U.S. Cl.
CPC ......... *H04B 7/0413* (2013.01); *H04B 7/0404* (2013.01)

(58) Field of Classification Search
CPC .. H04B 7/0404; H04B 7/0413; H04B 7/0602; H04B 7/0628
See application file for complete search history.

(56) References Cited

U.S. PATENT DOCUMENTS

2017/0338874 A1* 11/2017 Pratt ................... H04B 7/0862
2024/0187072 A1* 6/2024 Yang ................... H04B 7/0628

FOREIGN PATENT DOCUMENTS

CN 111867022 A 10/2020
WO 2021034564 A1 2/2021

OTHER PUBLICATIONS

Interdigital Inc: "On Solutions for Full TX UL Transmission", 3GPP TSG RAN WG1 #97, R1-1906862, Reno, USA, May 13-17, 2019, The whole document, 7 Pages.
(Continued)

*Primary Examiner* — Nguyen T Vo
(74) *Attorney, Agent, or Firm* — ArentFox Schiff LLP

(57) ABSTRACT

Aspects for enabling Multiple-Input-Multiple-Output (MIMO) communications using a plurality of transmitters across at least two supported frequency bands are disclosed. The apparatus may be a user equipment (UE) that includes, for each UE-supported frequency band, a plurality of transmitters capable when configured of coherently transmitting the received information over the frequency band with information to be transmitted to a base station. The apparatus can identify MIMO coherence capability information for the supported frequency bands on a per-band and a per-band combination basis. The apparatus may determine a proposed transmission configuration based on the MIMO capability information and may report, to the base station, the proposed transmission configuration.

26 Claims, 9 Drawing Sheets

(56) References Cited

OTHER PUBLICATIONS

Interdigital Inc: "Remaining Details on Non-CB based UL Transmission", 3GPP TSG RAN WG1 #93, R1-1807012, May 25, 2018(May 25, 2018), 3 Pages, The whole document.

International Search Report and Written Opinion—PCT/CN2021/122501—ISA/EPO—Jun. 23, 2022.

Qualcomm Incorporated: "UL MIMO Coherence Capabilities", 3GPP TSG RAN WG #93-e, RP-212108, 3rd Generation Partnership Project (3GPP), Mobile Competence Centre, 650, Route Des Lucioles, F-06921 Sophia-Antipolis Cedex, France, vol. TSG RAN, No. e-Meeting, Sep. 13, 2021-Sep. 17, 2021, 2 Pages, Sep. 6, 2021, XP052049393, p. 1-p. 2.

Supplementary European Search Report—EP21959020—Search Authority—MUNICH—May 12, 2025.

* cited by examiner

UPLINK MIMO COHERENCE CONFIGURABLE WIRELESS APPARATUS

CROSS REFERENCE TO RELATED APPLICATION(S)

This application is a National Phase entry of PCT Application No. PCT/CN2021/122501, entitled "UPLINK MIMO COHERENCE CONFIGURABLE WIRELESS APPARATUS" and filed on Oct. 2, 2021, which is expressly incorporated by reference herein in its entirety.

BACKGROUND

Technical Field

The present disclosure generally relates to communication systems, and more particularly, to transmitting multiple-input-multiple output (MIMO) coherent data streams across one or more uplink channels.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Multiple-input-multiple-output (MIMO) coherence generally refers to the capability of a user equipment (UE) or other device to transmit two or more coherent data streams from a plurality of transmitters present on the UE or other device. Each transmitter or transmit chain may incorporate dedicated include radio frequency (RF) transmitter circuits specific to carriers of a frequency band, one or more oscillator, and a corresponding antenna or set thereof. MIMO uplink coherence, whether when used with uplink transmit switching or otherwise, can enable a UE to potentially dramatically increase its bandwidth across multiple uplink carriers on the uplink. Current dual transmitter UEs, however, are generally limited to performing uplink coherence using a single frequency band, if at all. For example, in conventional UEs having dual transmitters, the use of uplink coherence is often restricted to a single frequency band at any given time. Thus, even if the UE has transmitters corresponding to different bands, at most, the UE can achieve coherence of multiple data streams using a single band. This restriction can degrade performance on the uplink.

Accordingly, aspects of the disclosure include configuring a UE to incorporate generic MIMO coherence capabilities on a basis of both an individual frequency band and a combination of frequency bands. In addition, the UE may further be configured to include an uplink transmit switching capability. In various configurations, the MIMO coherence capability may be defined using a single indicator for both (or all) frequency bands or as a separate capability for each band. In the exemplary case of a UE having four transmitters, two transmitters dedicated to each of two frequency bands, the UE may use two sets of coherent data streams of any other combination incorporating uplink transmit switching to concurrently transmit the simultaneous data streams across different frequency bands and carriers. Other aspects of the disclosure may include defining a separated uplink MIMO coherence capability for combinations of frequency bands, which may further incorporate uplink transmit switching in some configurations.

In an aspect of the disclosure, a method, a computer-readable medium, and an apparatus are provided. The apparatus for wireless communications includes a memory, and at least one processor coupled to the memory and configured to receive information to be transmitted to a base station, identify multiple-input-multiple-output (MIMO) coherence capability information for at least two UE-supported frequency bands on a per-band and a per-band combination basis, the UE comprising, for each UE-supported frequency band, a plurality of transmitters capable when configured of coherently transmitting the received information over the frequency band, determine a proposed transmission configuration based on the MIMO capability information, and report, to the base station, the proposed transmission configuration.

In another aspect of the disclosure, a method, a computer-readable medium, and an apparatus are provided. The apparatus for wireless communications includes a memory, a plurality of transmitters for each of at least two UE-supported frequency bands, the plurality of transmitters capable when configured of coherently transmitting information over the respective frequency band; and at least one processor coupled to the memory and configured to receive information to be transmitted to a base station, identify multiple-input-multiple-output (MIMO) coherence capability information for at least two UE-supported frequency bands on a per-band and per-band combination basis, identify support for uplink transmit (TX) switching, generate an indicator specifying, for the at-least two frequency bands, whether any of the frequency bands are coherent or non-coherent, determine a proposed transmission configuration based on the MIMO capability information and the uplink TX switching for at least one of the UE-supported frequency bands, and report, to the base station, the proposed transmission configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
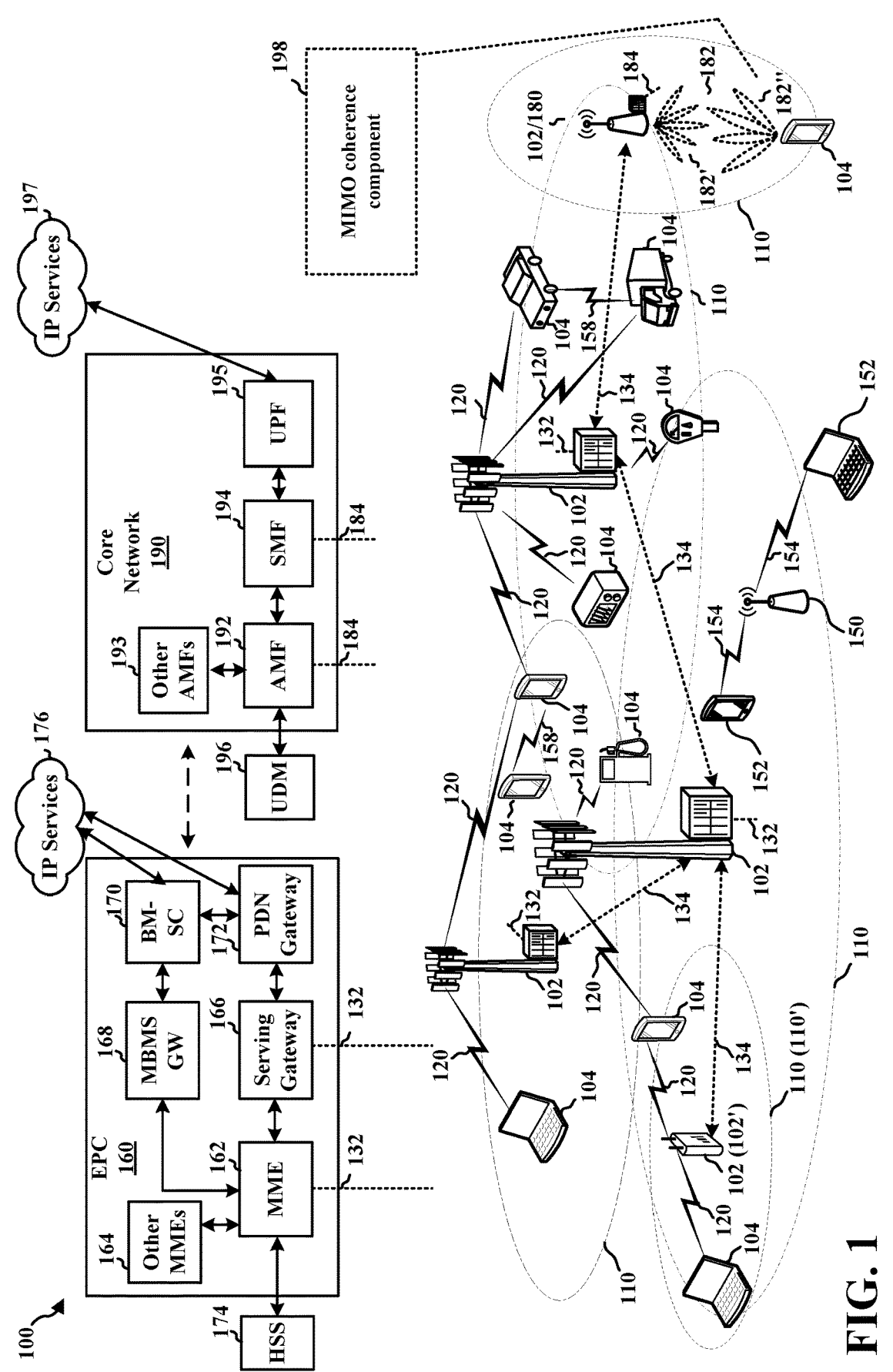
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which may be directly or indirectly (e.g., separated from an IAB donor by more than one hop) and/or one or more of the UEs 104, both of which may have communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a MIMO coherence component 198 configured to identify multiple-input-multiple-output (MIMO) coherence capability information for at least two UE-supported frequency bands on a per-band and a per-band combination basis. The UE includes, for each UE-supported frequency band, a plurality of transmitters capable when configured of coherently transmitting the received information over the frequency band. Component 198 may also be configured to determine a proposed transmission configuration based on the MIMO capability information. Via the UE capability report and/or other signaling, the UE may report, to the base station, the proposed transmission configuration. Component 198 may also be configured to specify, using a common indicator such as an information element or a separate indicator such as a plurality of band-specific or transmitter-specific information elements, the proposed transmission configuration, as described in further detail herein.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figures 2A, 2B, 2C, 2D:
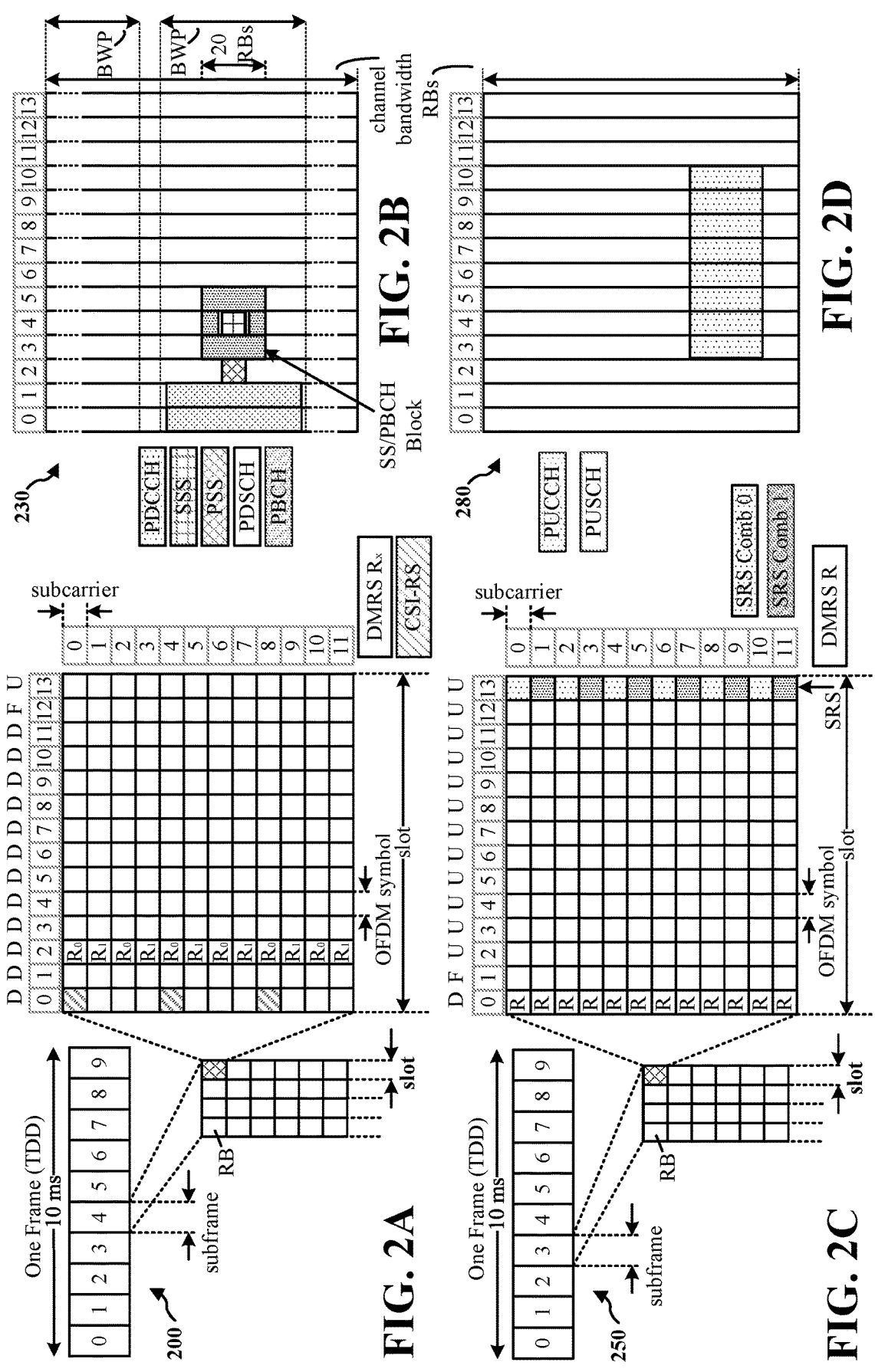
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
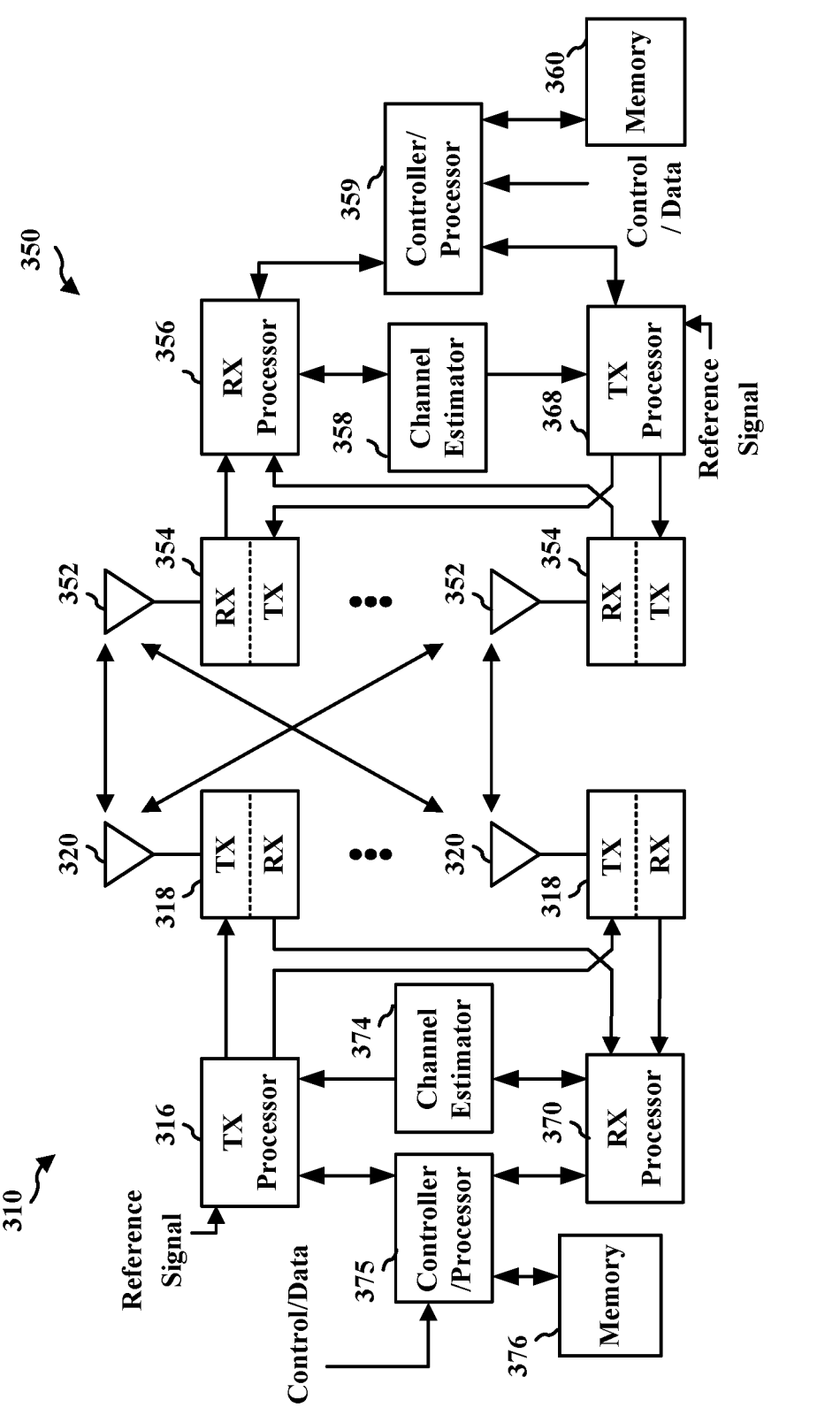
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Multiple-input-multiple-output (MIMO) coherence enables a wireless device including a UE to simultaneously transmit multiple coherent data streams from a single transmitter over a single frequency band including two or more carriers to a base station. Generally, two data streams from a transmitter are coherent where there phases are synchronized, whether precisely or with a known, fixed delay. Where two or more uplink data streams are coherent, the base station can receive, combine and decode the data and achieve much greater bandwidth efficiency than receiving just a single stream. As an example, a UE may include a plurality of transmit chains, each transmit chain associated with dedicated RF transmit circuitry along with a set of antennas. In some exemplary configurations, two transmitters sending uplink information from the UE on a particular frequency band may share certain transmit circuitry, such as a crystal oscillator, thereby facilitating the coherent transmission of data. The UE may use spatial multiplexing and other MIMO-based techniques to transmit additional data streams concurrently from its other transmitters. As an example, the UE may be using beamforming to send concurrent data streams over different frequency bands to more than one base station. It will be appreciated that, to accomplish MIMO coherence between two or more transmitters for the purposes of this disclosure, the transmitters in some cases need not share circuitry and may instead be independent.

In other cases, the transmitter may use time division duplex for NR (TDD-NR) to switch between two coherent data streams from different transmitters over the same channel using a technique known as uplink transmit (TX) switching. Uplink TX switching may use a single transmitter to switch, using TDD, between two different bands (FIG. 4).

As noted above, conventional wireless 5G NR techniques have various limitations. For current 3GPP specifications, uplink MIMO capability is circumscribed to a per frequency band (per-band) capability, as in TS36.306. This is in contrast to allowing uplink TX switching also per-frequency band combination (per BC), as is currently approved in RAN4. For example, current 3GPP UEs may be operationally restricted to include a single transmitter, in certain circumstances, for transmitting data over a frequency band. Conventional UEs may be restricted to two transmit chains, or two sets of dedicated transmit circuitry, to maintain simplicity. In such a case, uplink TX switching may be used to switch between bands in certain modes. In Release 16 of the 3GPP standard, uplink TX switching allows two transmitters for one of the two carriers (from two bands). The above capability, however, is restricted to the 2-transmitter (TX) band as described in greater detail below. Since only two transmitters are available in these cases, in order to provide uplink coherent data streams for a single carrier or single band, one transmitter must effectively borrow the carrier bandwidth from the other transmitter. During a TDD period where the two transmitters are transmitting coherently over the same frequency band, there are no carriers during this time available for transmitting over the other band. This existing scenario results in substantially decreased network bandwidth and efficiency, as the nontransmitting frequency band must wait until its allowed time slot to provide a data stream over a single transmitter.

Figure 4:
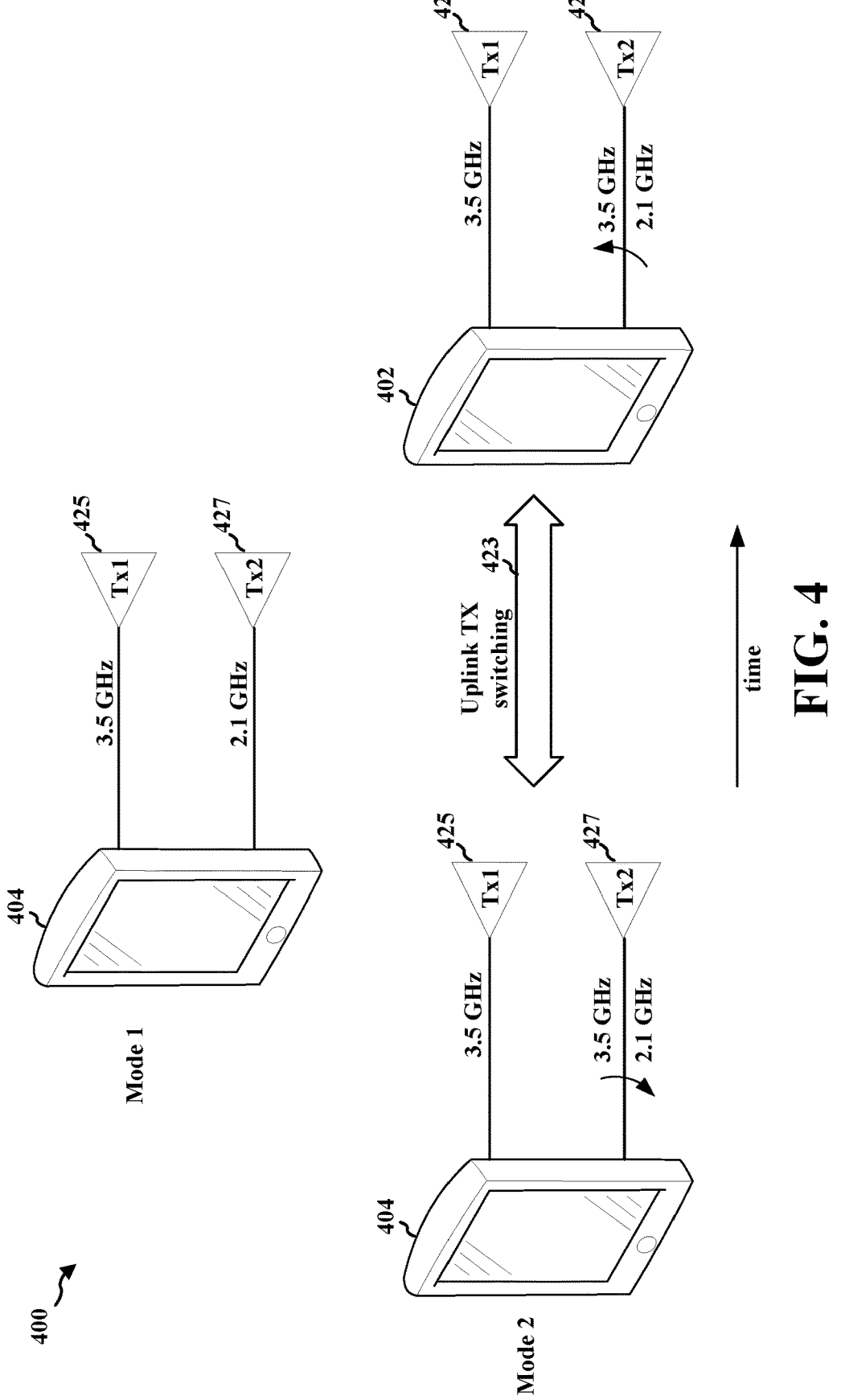
FIG. 4 is a conceptual diagram illustrating exemplary transmit layouts of a UE.

FIG. 4 is a conceptual diagram illustrating exemplary transmit layouts 400 of a UE 404. The UE 404 in this example may include two transmitters. While the UE 404 may include two internal transmit chains, each dedicated to transmitting data across one or more carriers of a specific frequency band, it may be assumed for simplicity that Tx1 425 and Tx2 427 represent antennas for transmitting an uplink data signal. For example, with reference to mode 1, the UE 404 may be configured to transmit carriers in a 3.5 GHz band using Tx1 425. Separately, in mode 1, the UE 404 may be configured to transmit carriers in a 2.1 GHz band using Tx2 427. In this example, there are simply two data non-coherent data streams be transmitted to a base station across different bands.

Referring to mode 2 of FIG. 4, uplink TX switching 423 may be used. In this case, carriers in the 3.5 GHz frequency band are transmitted over Tx1 425, as before. However, for Tx2 427, the UE 404 is using uplink TX switching 423 to switch, using TDD between the two different bands. For example, during a first time period, Tx2 427 may be transmitting over carriers in a 2.1 GHz band while Tx1 425 transmits data using the 3.5 GHz band as in the mode 1 example. During this TDD period, mode 2 may operationally the same as mode 1 in that two non-coherent data streams over two disparate bands are simultaneously transmitted. During the uplink TX switching period 423, however, Tx2 may switch to transmitting a data stream in the 3.5 GHz band across Tx2 427, as shown in the right figure of mode 2. During this period, it may be possible for Tx1 425 and Tx2 427 to be coherently transmitting data streams using the same band, enabling the receiving base station (not shown) to receive and decode the data much faster than if a single data stream were used.

One shortcoming of the above configuration is that, to use MIMO coherent transmissions, Tx2 427 of FIG. 4 must use carriers for the 3.5 GHz frequency band during the time period when it is performing uplink TX switching. This leaves no bandwidth to transmit the carriers over the 2.1 GHz frequency band. Further, even assuming the 2.1 GHz frequency band in this example has two transmit chains, if MIMO coherence is not defined on a per-BC basis, then the UE 404 could not be configured to transmit both bands over more than one data stream. In sum, a need exists for a robust apparatus and technique for providing a signaling configuration that enables a UE to send coherent streams of information for each one of the two or more frequency bands that the UE is capable of supporting.

Accordingly, in an aspect of the disclosure, a UE is provided that enables concurrent uplink MIMO coherence capability across two or more UE-supported frequency bands. A generic per-band per-BC capability may be defined. In some configurations, this generic capability is in addition to a defined capability for uplink TX switching.

Figure 5:
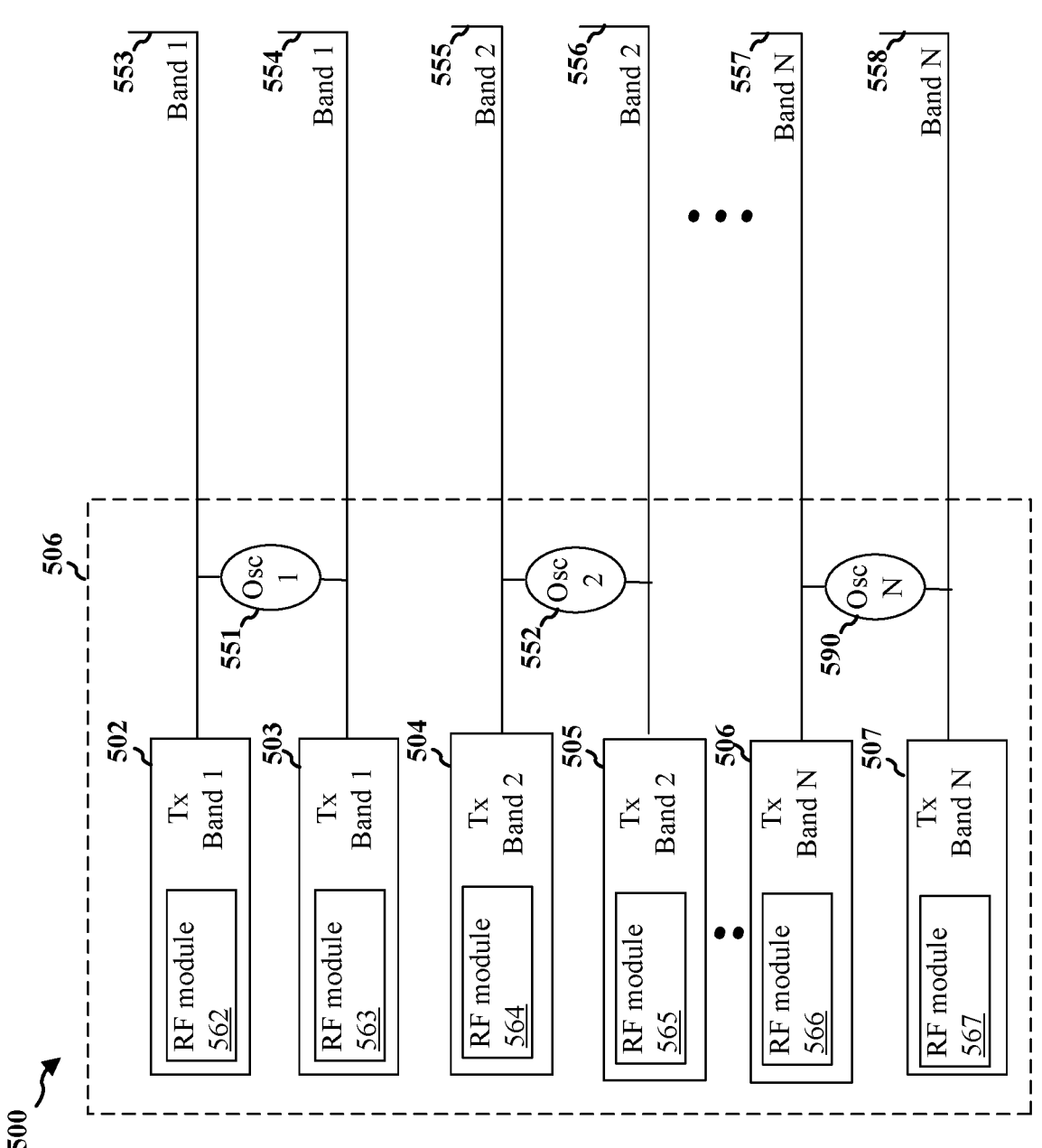
FIG. 5 is a block diagram of a group of transmit chains in a UE for transmitting two or more coherent signals over multiple frequency bands.

FIG. 5 is a block diagram of an example group of transmit chains 500 in a transceiver module 506 UE for transmitting two or more coherent signals over multiple frequency bands. Transmit chains 500 may be present within the UE on a printed circuit board (PCB) or multiple such PCBs as part as a transceiver for the system. In the example of FIG. 5, two transmitters each from transmitters 502-507 are shown to correspond to a single frequency band (e.g., band 1, band 2, etc.), although this need not be the case and instead, a single module (e.g., transmitter 502) may be capable of transmitting over carriers of more than one frequency band. In the example of FIG. 5, there are a total of N transmitters, where N is some positive integer greater than or equal to two. Each transmitter in this example identifies a frequency band over which it can transmit, although as noted, in some configurations a transmit chain may be configured to transmit across more than one frequency band. In FIG. 5, each of the transmitters 502, 503, 504, 505, 506 and 5-07 include a respective RF module 562, 563, 564, 565, 566, and 567. In practice, the RF modules may share circuitry in order to provide a more streamlined design.

As noted, in the example of FIG. 5, each frequency band 1, 2 . . . N may share various circuitry. Transmitters 502 and 503 share an oscillator 551 for transmitting data streams across carriers in band 1. Likewise, transmitters 504 and 505 may share an oscillator 552 for transmitting data streams across carriers in band 2, and transmitters 506 and 507 may share an oscillator 590 for transmitting data over band N. Each transmitter 502-507 may include an antenna or set thereof, including antennas 553, 554, 555, 556, 557 and 558. In other configurations, one or more antennas may be shared, such as when uplink transmit switching is employed. The transmitter of FIG. 5 may also be capable of beamforming, spatial multiplexing and other MIMO techniques. In some implementations, the transmit module 506 for the UE may include four transmitters, two of which may be configured to transmit data over one frequency band and two of which may be configured to transmit data over another frequency band.

Further, in the example of FIG. 5, transmitters 502 and 503 may transmit coherent data streams coherently over band 1 using antennas 553 and 554 to the base station. In other arrangements, transmitters may rely at least in part on uplink transmit switching or another multiplexing technique to send coherent transmissions. In short, the principles of the disclosure are not limited to the configuration of FIG. 5, and one skilled in the art upon perusal of the present disclosure should appreciate that different or additional circuit and antenna configurations may be implemented without departing from the spirit or scope of the present disclosure.

In one aspect of the disclosure involving a UE having at least 2 TX capability (two transmit chains per band) and without uplink TX switching capability, a UE having received information to transmit may identify a proposed transmission configuration on a per-band and per-BC basis, and the UE may transmit the proposed configuration to the network (e.g., sent to the base station in a UE capability report). It is assumed for ease of description and to avoid obscuring the concepts herein that two frequency bands are used by an exemplary UE. In one configuration, the UE may send an indicator identifying a single UL MIMO coherence capability applicable to both frequency bands. In one implementation, bitmapping may be used for each band. That is, one or more bits may be assigned to each band to identify the relative capabilities of the UE (coherent, non-coherent, partially coherent). An exemplary indicator may include the following information: ULcoherence_bandcomb_A_B= ('Field1'; 'Field2')

In this exemplary information element (IE), A and B may correspond to different frequency bands. 'Field1' may correspond to a first frequency band, and 'Field2' may correspond to the second frequency band. Any of 'Field1' or 'Field2' may indicate that the identified frequency band is coherent, partially coherent (e.g., in cases involving more than two transmitters), or non-coherent. Thus, for example, different transmit chains relating to the first band may be configured to transmit the received information coherently, while transmitter relating to the second band may not. Notably, in this configuration, where both 'Field1' and 'Field2', the UE can coherently transmit two or more data streams for each band, substantially increasing the bandwidth on the uplink and in contrast to conventional techniques. It may be assumed for purposes of this example that uplink TX switching is not configured. Thus, as in the example of FIG. 5, separate transmitters may be used to coherently transmit the information for different bands.

In another configuration, the UE may separately specify the uplink configuration for each band, in another case not involving uplink TX switching. That is to say, each band may have a separate indicator. An example of such an indicator may include the following information:

$$ULcoherence\_bandcomb\_A\_B = (\text{'Field1'};\text{'Field2'})$$

In this example, like in the previous example, A and B may correspond to two different frequency bands. Unlike the previous example, however, 'Field1' may be used by the UE to identify the frequency band being referenced (e.g., Band A), and 'Field2' may be used to indicate whether the specified band (Band A) is coherent, partially coherent, or non-coherent. Where Band B is also being used, a separate indicator may be specified for Band B. Thus, for N frequency bands being utilized in the context of FIG. 5, N indicators may be used to provide the desired uplink MIMO coherence information.

In still another configuration, a proposed transmission configuration may be identified along with an uplink TX switching capability. Where a generic per band per BC capability is specified as in the above example, the UE in one aspect can use that information along with an additional indicator referencing that information. For example, assuming the generic specified capability for the above BC (ULcoherence_bandcomb_A_B=('Field1'; 'Field2')) has been specified, the UE may provide another uplink TX-switching capability indicator based on the generic indicator. In one aspect, a proposed capability for uplink TX switching may take the form of the following exemplary indicator:

$$ULcoherence\_bandcomb\_Txswitching\_A\_B = (\text{'Field3'}: \text{'Field4'})$$

This indicator may simply provide each of 'Field3' and 'Field4' with a Yes or a No, which may be based on the generic capability specified above. Thus, where a frequency band can be coherent and uplink switching is set to yes, the UE may be configured to use one of the transmitters/ antennas to switch between frequency bands in a manner that allows coherent use of another data stream. This embodiment may be relevant where a limited number of transmitters are available and coherence is nonetheless achievable using uplink TX switching.

In additional implementations involving two-transmitter capability of the UE, such as in FIG. 5 wherein a given frequency band has at least two transmitters, the proposed transmission configuration for data to be transmitted may use an indicator substantially identical to the above indicator (ULcoherence_bandcomb_A_B=('Field1'; 'Field2')) in which the UL MIMO coherence may be specified on a per-BC basis in addition to the per-band basis indicated by the fields within the indicator. Thus, one or more bits may be assigned to each band that can be transmitted to the station as part of a single indicator. In addition, to identify a configuration having uplink TX capability, an indicator like the above indicator "ULcoherence_bandcomb_Txswitching_A_B=('Field3'; 'Field4')" may be used for an exemplary two transmitter-per band UE, in which the affirmative or negative indication for these two fields may be based on the generic MIMO coherence capability.

In another aspect of the disclosure, a UE may be configured to achieve MIMO coherence only with the capability of uplink TX switching, where specifying the MIMO coherence is on a per band basis. Thus, in this implementation, a capability for 2Tx-2Tx uplink TX switching may be defined. An uplink switching indicator similar to the one described above may be included to enable the UE to specify this capability on a per band basis.

Figure 6:
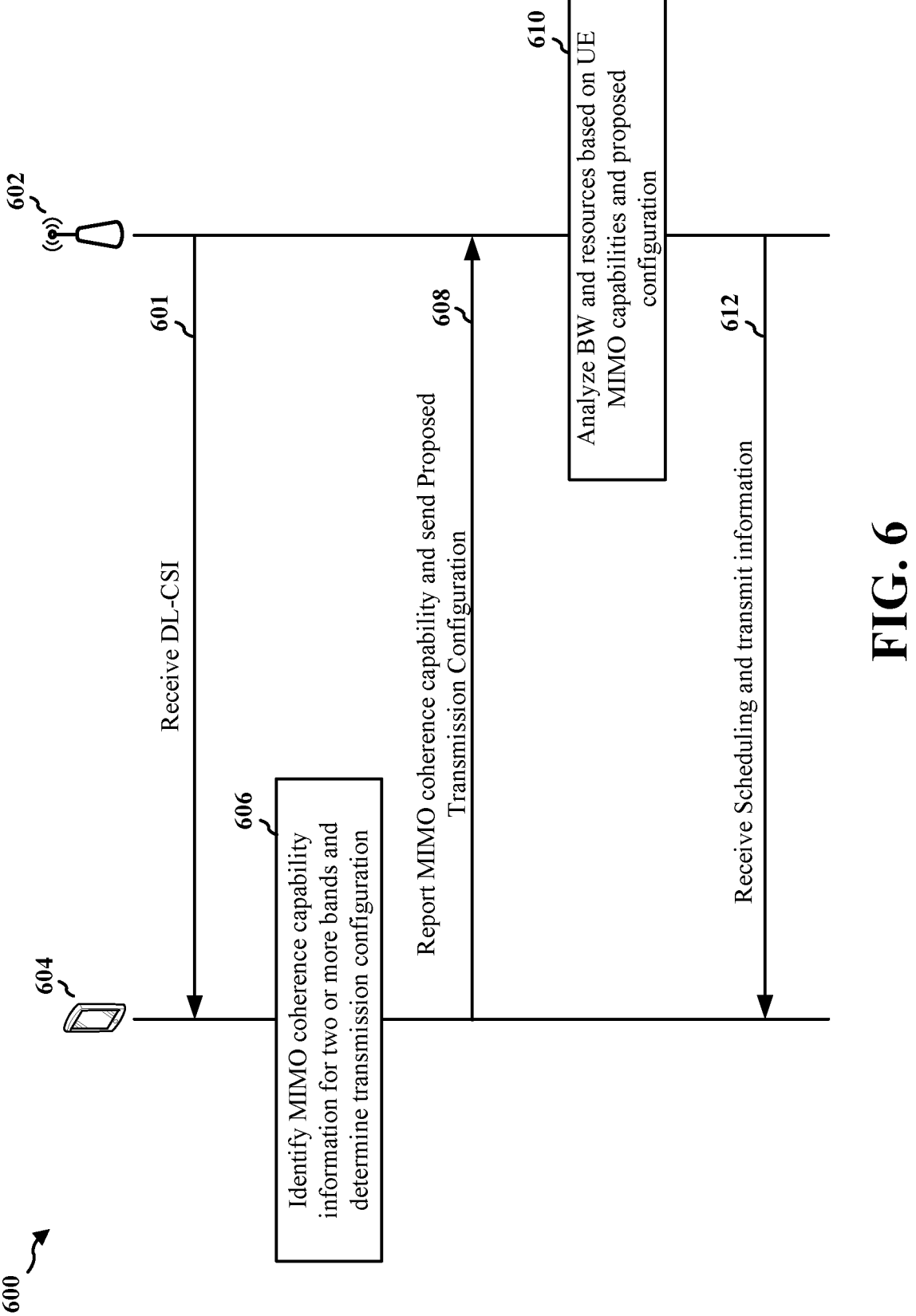
FIG. 6 is a timing diagram illustrating an exemplary technique for establishing multi-channel uplink transmission using MIMO coherence.

FIG. 6 is a timing diagram illustrating an exemplary technique for establishing multi-channel uplink transmission using MIMO coherence. FIG. 6 may include a base station 602 and a UE 604 as described above in one or more of the configurations. At 601, the UE 604 receives a downlink signal from the base station including channel state information. It is assumed that at some point the UE may receive information to transmit to the base station. At 606, the UE identifies a proposed transmission configuration based on MIMO coherence capability information for two or more bands. Thereupon, as part of a UE capability report along with one or more additional transmissions, the UE reports to the base station a MIMO coherence capability along with a proposed transmission configuration. In some configurations, the proposed transmission configuration is implicitly embodied in the UE capability information, and additional information is not necessary to specify further configuration information.

At 610, the base station may analyze its available bandwidth and resource in light of the UE MIMO capabilities and proposed configuration, and makes a scheduling determination. The UE 604 receives the scheduling and transmit information at 612. The UE 604 can thereupon transmit the data in accordance with the received scheduling information.

Figure 7:
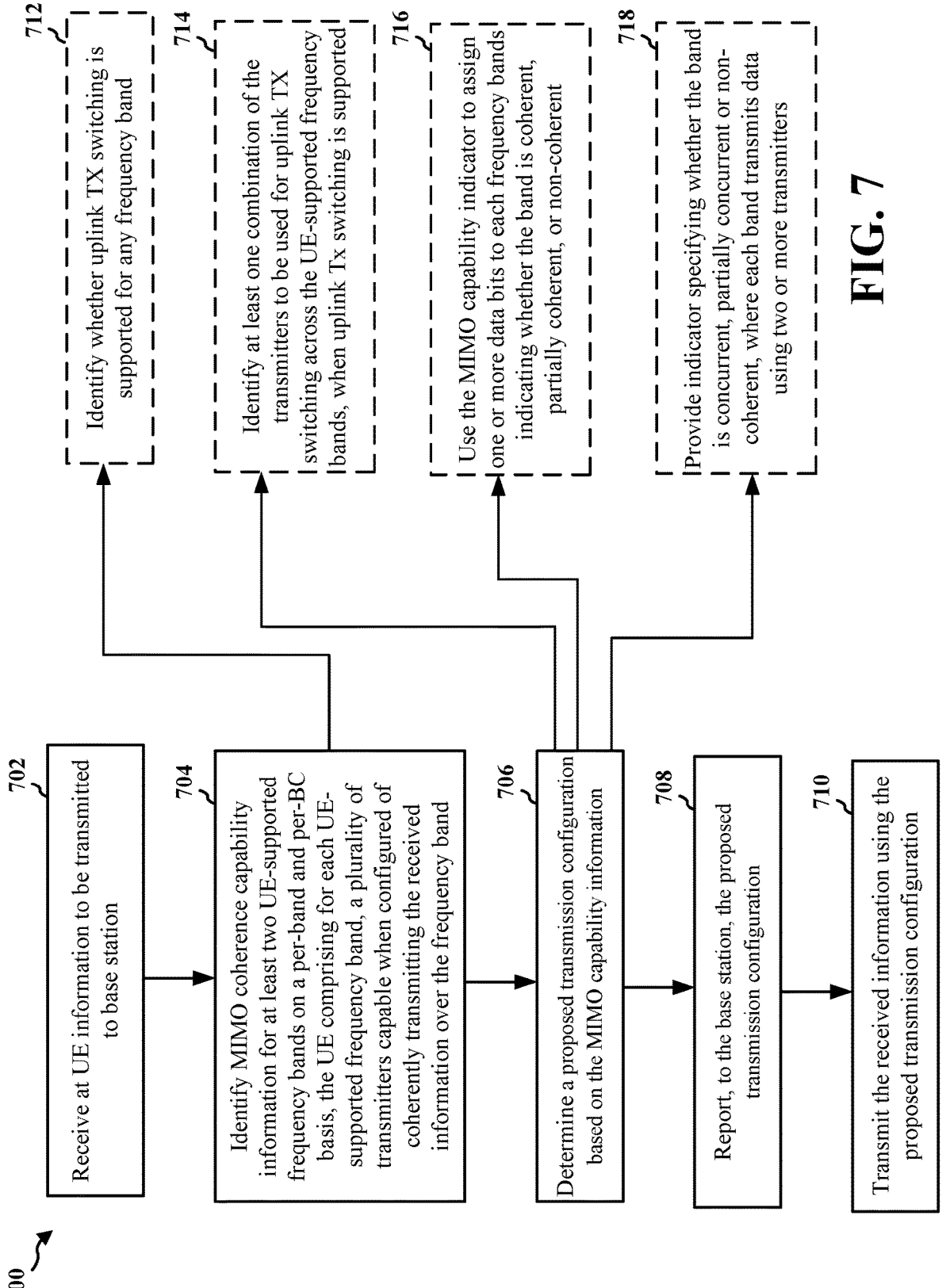
FIG. 7 is a flowchart of a method of wireless communication.

FIG. 7 is a flowchart of a method 700 of wireless communication. The method may be performed by a UE (e.g., the UE 104 (FIG. 1); UE 350 (FIG. 3); UE 404 (FIG. 4), the apparatus 902). For example, the method of FIG. 7 may be performed by the UE with the transmit module 506 or variation thereof, or components 940, 942, 944, 946, 948, 950, 952 and 954 of FIG. 9. The dashed boxes may be considered optional.

At 702, the UE may receive from any relevant source information to be transmitted to a corresponding base station. The information may be voice information, data input by a user, or internal data, etc. At 704, the UE may identify MIMO coherence capability information for at least two UE-supported frequency bands on a per-band and per-BC basis. The UE may include, for each UE-supported frequency band, a plurality of transmitters capable when configured of coherently transmitting the received information over the frequency band. In one example, the UE includes at least two transmit chains for transmitting at least two bands over a plurality of corresponding carriers.

Thereupon, at 706, the UE may determine a proposed transmission configuration based on the MIMO capability information. For example, the UE may prepare one or more indicators including information, if applicable regarding multiple coherent transmissions over a band, uplink TX switching, and other relevant transmit information. The UE may then report this proposed transmission configuration to the base station (708), as part of a capability reporting and/or with respect to additional functions. The UE may then transmit the received information using the proposed transmission configuration (710), assuming the base station has authorized this configuration.

In some configurations, the UE may identify whether uplink TX switching is supported for any frequency band or combination thereof (712). If so, the UE may identify at least one combination of the transmitters to be used for uplink TX switching across the UE-supported frequency bands (714). In various implementations, the UE may use the MIMO capability indicator to assign one or more data bits to each frequency bands indicating whether the band is coherent, partially coherent, or non-coherent (716). In addition, in some implementations, the UE may provide an indicator specifying, on a per band basis, whether the band is coherent, partially coherent, or non-coherent (718).

Figure 8:
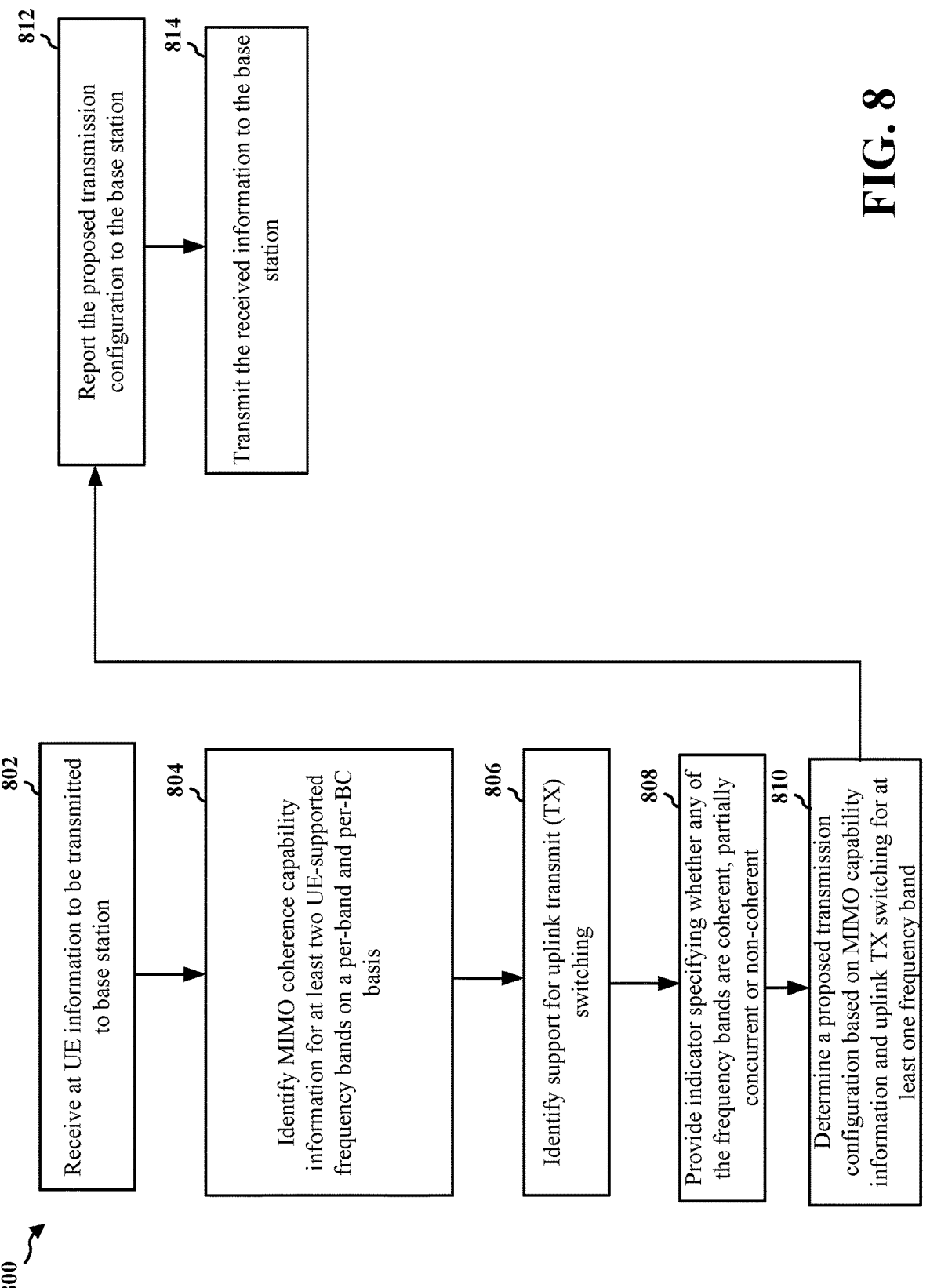
FIG. 8 is a flowchart of a method of wireless communication.

FIG. 8 is a flowchart of another method 800 of wireless communication. The method may be performed by a UE (e.g., the UE 104 (FIG. 1); UE 350 (FIG. 3); UE 404 (FIG. 4), the apparatus 902). For example, the method of FIG. 8 may be performed by the UE with the transmit module 506 or variation thereof, or components 940, 942, 944, 946, 948, 950, 952 and 954 of FIG. 9. The dashed boxes may be considered optional.

At 802, the UE may receive from any relevant source information to be transmitted to a corresponding base station. As in FIG. 7, the information may be voice information, data input by a user, or internal data, etc. At 804, the UE may identify MIMO coherence capability information for at least two UE-supported frequency bands on a per-band and per-BC basis.

Thereupon, at 806, the UE identifies support or capability of one or more frequency bands for uplink TX switching.

The UE may prepare one or more indicators including MIMO coherence information and TX uplink switching information as described above, and may provide the information to a base station (808), as part of a capability reporting and/or with respect to additional functions. Concurrently, the UE may determine a proposed transmission configuration based on MIMO coherence capability information and uplink TX switching capabilities (810), and may report this information to the base station (812).

The UE may then transmit the received information using the proposed transmission configuration (810), assuming the base station has authorized this configuration.

Figure 9:
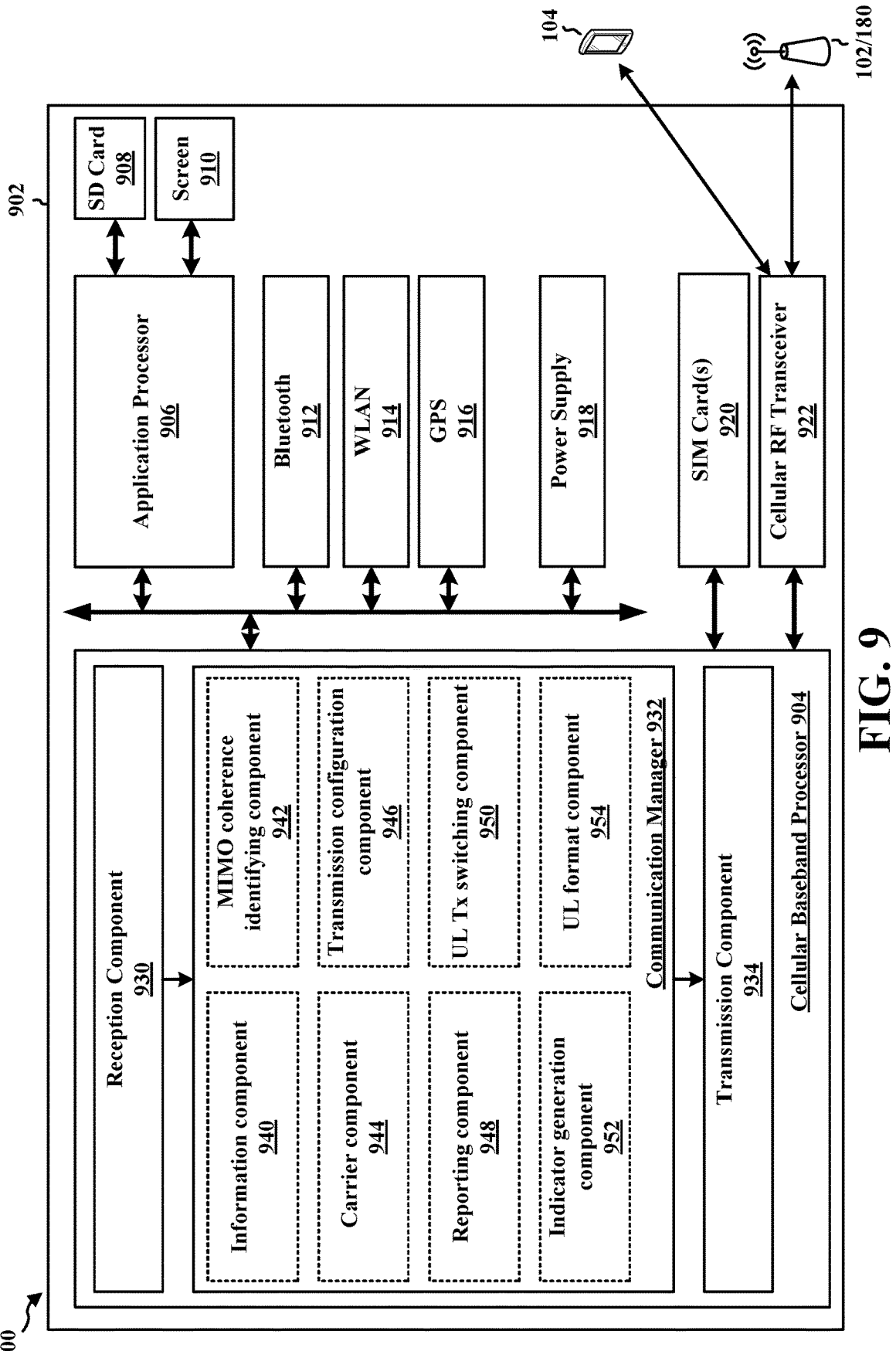
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or base station 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904.

In the context of FIG. 3, the cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., the UE 350 of FIG. 3) and include the aforediscussed additional modules of the apparatus 902. In one configuration, the cellular RF transceiver 922 may be implemented as at least one of the transmitter 354TX and/or the receiver 354RX.

The communication manager 932 includes a component 940 that is configured to receive and store information that will be transmitted as data or control information on the uplink, e.g., as described in connection with step 702 in FIG. 7 and step 802 in FIG. 8. The communication manager 932 further includes components 942 and 954 that receives input in the form of uplink configuration data from memory and is configured to determine MIMO coherence capabilities for different bands, carriers, and transmitters, e.g., as described in connection with 704 and 804 in FIGS. 7 and 8, respectively. The communication manager 932 further includes a carrier component 944 that receives input in the form of MIMO coherence configurations from the component 940 and is configured to identify the carriers for use in transmitting data across one or more bands, e.g., as described in connection with step 710 of FIG. 7 and 814 of FIG. 8. The communication manager 932 further includes a component 946 that receives input in the form of MIMO coherence capability data from component 942 and is configured to determine a propose transmission configuration based on MIMO coherence capabilities for different bands, carriers, and transmitters, e.g., as described in connection with 704 and 804 in FIGS. 7 and 8, respectively.

The communication manager 932 further includes a component 952 that receives input in the form of MIMO coherence capability data from component 942 as described in connection with steps 706 and 808 of FIGS. 7 and 8, respectively. The communication manager 932 further includes a component 950 that receives input in the form of TX switching capabilities from components 942, 946 and memory and is configured to provide this capability information to component 952, the latter of which generates an indicator, if appropriate. The communication manager 932 may also include component 948, which receives data in the form of generated indicators from component 952 and which provides this information to the transmission component 934 for transmitting.

The apparatus 902 may include additional components that perform some or all of the blocks, operations, signaling, etc. of the algorithm(s) in the aforementioned timing diagram of FIG. 6 and flowcharts of FIGS. 7 and 8. As such, some or all of the blocks, operations, signaling, etc. in the aforementioned flowchart(s) of FIGS. 6-8 may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for means for receiving information to be transmitted to a base station; means for identifying multiple-input-multiple-output (MIMO) coherence capability information for at least two UE-supported frequency bands on a per-band and a per-band combination basis, the UE comprising, for each UE-supported frequency band, a plurality of transmitters capable when configured of coherently transmitting the received information over the frequency band; means for determining a proposed transmission configuration based on the MIMO capability information; means for reporting, to the base station, the proposed transmission configuration; means for transmitting the received information using the proposed transmission configuration, and means for identifying support for uplink transmit (TX) switching.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method for wireless communication at a user equipment (UE), comprising: receiving information to be transmitted to a base station; identifying multiple-input-multiple-output (MIMO) coherence capability information for at least two UE-supported frequency bands on a per-band and a per-band combination basis, the UE comprising, for each UE-supported frequency band, a plurality of transmitters capable when configured of coherently transmitting the received information over the frequency band; determining a proposed transmission configuration based on the MIMO capability information; and reporting, to the base station, the proposed transmission configuration.

Example 2 is the method of example 1, further comprising reporting to the base station the MIMO coherence capability information.

Example 3 is the method of any of examples 1 and 2, further comprising transmitting the received information using the proposed transmission configuration.

Example 4 is the method of any of examples 1 to 3, further comprising identifying whether uplink transmit (TX) switching is supported for any one or more of the UE-supported frequency bands.

Example 5 is the method of any of examples 1 to 4, wherein, when uplink TX switching is supported, determining the proposed transmission configuration further comprises identifying at least one combination of the transmitters to be used for uplink TX switching across one of the UE-supported frequency bands.

Example 6 is the method of any of examples 1 to 5, wherein the proposed transmission configuration comprises a single MIMO capability indicator specifying a configuration for transmitting the received information over at least one of the UE-supported frequency bands.

Example 7 is the method of any of examples 1 to 6, wherein determining the proposed transmission configuration comprises using the MIMO capability indicator to assign one or more data bits to each of the UE-supported frequency bands, the one or more data bits indicating whether the corresponding frequency band is coherent, partially coherent, or non-coherent.

Example 8 is the method of any of examples 1 to 7, wherein, when uplink TX switching is not supported, each frequency band identified as coherent is configured to support transmission over at least two independent transmitters of the plurality of transmitters.

Example 9 is the method of any of examples 1 to 8, wherein when uplink transmit (TX) switching is supported, determining the proposed transmission configuration comprises providing a MIMO capability indicator specifying the UE-supported frequency bands and an uplink TX indicator specifying whether each specified frequency band supports uplink TX switching.

Example 10 is the method of any of examples 1 to 9, wherein determining the proposed transmission configuration comprises providing an indicator specifying, for the UE-supported frequency bands, whether each of the specified frequency bands is coherent, partially coherent or non-coherent; and each of the specified bands is configured to transmit the received information using a plurality of transmitters.

Example 11 is a method for wireless communication at a user equipment (UE), comprising: receiving information to be transmitted to a base station; identifying multiple-input-multiple-output (MIMO) coherence capability information for at least two UE-supported frequency bands on a per-band and per-band combination basis; identifying support for uplink transmit (TX) switching; providing an indicator specifying, for the at-least two frequency bands, whether any of the frequency bands are coherent, partially coherent or non-coherent; determining a proposed transmission configuration based on the MIMO capability information and the uplink TX switching for at least one of the UE-supported frequency bands; and reporting, to the base station, the proposed transmission configuration.

Example 12 is the method of example 11, wherein a separate indicator is provided for each of the UE-supported frequency bands, the separate indicator further specifying whether the frequency band is coherent, partially coherent or non-coherent.

Example 13 is the method of any of examples 11 and 12, further comprising transmitting the received information to the base station.

Example 14 is an apparatus for wireless communications comprising: a memory; and a plurality of transmitters for each of at least two UE-supported frequency bands, the plurality of transmitters capable when configured of coherently transmitting information over the respective frequency band; and at least one processor coupled to the memory and configured to: receive information to be transmitted to a base station; identify multiple-input-multiple-output (MIMO) coherence capability information for the UE-supported frequency bands on a per-band and a per-band combination basis; determine a proposed transmission configuration based on the MIMO capability information; and report, to the base station, the proposed transmission configuration.

Example 15 is the apparatus of example 14, wherein the at least one processor is further configured to report to the base station the MIMO coherence capability information.

Example 16 is the apparatus of any of examples 14 and 15, wherein the at least one processor is further configured to transmit the received information using the proposed transmission configuration.

Example 17 is the apparatus of any of examples 14 to 16, wherein the at least one processor is further configured to identify whether uplink transmit (TX) switching is supported for any one or more of the UE-supported frequency bands.

Example 18 is the apparatus of any of examples 14 to 17, wherein, when uplink TX switching is supported, the at least one processor is further configured to identify at least one combination of the transmitters to be used for uplink TX switching across one of the UE-supported frequency bands.

Example 19 is the apparatus of any of examples 14-18, wherein the proposed transmission configuration comprises a single MIMO capability indicator specifying a configuration for transmitting the received information over at least one of the UE-supported frequency bands.

Example 20 is the apparatus of any of examples 14-19, wherein the at least one controller is further configured to assign one or more data bits to each of the UE-supported frequency bands using the MIMO capability indicator, the one or more data bits indicating whether the corresponding frequency band is coherent, partially coherent, or non-coherent.

Example 21 is the apparatus of any of examples 14-20, wherein, when uplink TX switching is not supported, the at least one controller is further configured to identify each frequency band as coherent to thereby support transmission over the frequency band using at least two independent transmitters of the plurality of transmitters.

Example 22 is the apparatus of any of examples 14-21, wherein when uplink transmit (TX) switching is supported, the at least one processor is further configured to generate a MIMO capability indicator specifying the UE-supported frequency bands and an uplink TX indicator specifying whether each specified frequency band supports uplink TX switching.

Example 23 is the apparatus of any of examples 14-22, wherein the at least one processor is further configured to: generate an indicator specifying, for the UE-supported frequency bands, whether each of the specified frequency bands is coherent, partially coherent or non-coherent; and transmit the received information over each of the frequency bands using a plurality of transmitters.

Example 24 is an apparatus for wireless communications, comprising: a memory; a plurality of transmitters for at least two UE-supported frequency bands; and at least one processor coupled to the memory and configured to: receive information to be transmitted to a base station; identify multiple-input-multiple-output (MIMO) coherence capability information for at least two UE-supported frequency bands on a per-band and per-band combination basis; identify support for uplink transmit (TX) switching; generate an indicator specifying, for the at-least two frequency bands, whether any of the frequency bands are coherent, partially coherent or non-coherent; determine a proposed transmission configuration based on the MIMO capability information and the uplink TX switching for at least one of the UE-supported frequency bands; and report, to the base station, the proposed transmission configuration.

Example 25 is the apparatus of example 24, wherein the at least one processor is further configured to generate a separate indicator for each of the UE-supported frequency bands, the separate indicator further specifying whether the frequency band is coherent, partially coherent or non-coherent.

Example 26 is the apparatus of any of Examples 24 and 25, wherein the at least one processor is further configured to transmit the received information to the base station.

Example 27 is an apparatus for wireless communications, comprising: means for receiving information to be transmitted to a base station; means for identifying multiple-input-multiple-output (MIMO) coherence capability information for at least two UE-supported frequency bands on a per-band and a per-band combination basis, the UE comprising, for each UE-supported frequency band, a plurality of transmitters capable when configured of coherently transmitting the received information over the frequency band; means for determining a proposed transmission configuration based on the MIMO capability information; and means for reporting, to the base station, the proposed transmission configuration.

Example 28 is the apparatus of example 27, wherein the means for reporting is further configured to report to the base station the MIMO coherence capability information.

Example 29 is the apparatus of any of examples 27 and 28, further comprising means for transmitting the received information using the proposed transmission configuration.

Example 30 is the apparatus of any of examples 27 to 29, wherein the means for identifying is further configured to identify whether uplink transmit (TX) switching is supported for any one or more of the UE-supported frequency bands.

Example 31 is the apparatus of any of examples 27 to 30, wherein, when uplink TX switching is supported, the means for identifying is further configured to identify at least one combination of the transmitters to be used for uplink TX switching across one of the UE-supported frequency bands.

Example 32 is the apparatus of any of examples 27 to 31, wherein the proposed transmission configuration comprises a single MIMO capability indicator configured to specify a configuration for transmitting the received information over at least one of the UE-supported frequency bands.

Example 33 is the apparatus of any of examples 27 to 32, wherein the means for identifying is further configured to assign one or more data bits to each of the UE-supported frequency bands using the MIMO capability indicator, the one or more data bits indicating whether the corresponding frequency band is coherent, partially coherent, or non-coherent.

Example 34 is the apparatus of any of examples 27 to 33, wherein when uplink TX switching is not supported, the means for identifying is further configured to identify each frequency band as coherent to thereby support transmission over the frequency band using at least two independent transmitters of the plurality of transmitters.

Example 35 is an apparatus for wireless communications, comprising: means for receiving information to be transmitted to a base station; means for identifying multiple-input-multiple-output (MIMO) coherence capability information for at least two UE-supported frequency bands on a per-band and per-band combination basis; means for identifying support for uplink transmit (TX) switching; means for generating an indicator specifying, for the at-least two frequency bands, whether any of the frequency bands are coherent or non-coherent; means for determining a proposed transmission configuration based on the MIMO capability information and the uplink TX switching for at least one of the UE-supported frequency bands; and means for reporting, to the base station, the proposed transmission configuration.

Example 36 is the apparatus of example 35, wherein the means for generating is further configured to generate a separate indicator for each of the UE-supported frequency bands, the separate indicator further specifying whether the frequency band is coherent, partially coherent or non-coherent.

Example 37 is the apparatus of examples 35 and 36, further comprising means for transmitting the received information to the base station.

Example 38 is a computer-readable medium storing computer-executable code, the code when executed by a processor cause the processor to: receive information to be transmitted to a base station; identify multiple-input-multiple-output (MIMO) coherence capability information for at least two UE-supported frequency bands on a per-band and a per-band combination basis; determine a proposed transmission configuration based on the MIMO capability information; and report, to the base station, the proposed transmission configuration.

Example 39 is the computer-readable medium of example 38, wherein the code further causes the processor to report to the base station the MIMO coherence capability information.

Example 40 is the computer-readable medium of examples 38 and 39, wherein the code further causes the processor to transmit the received information using the proposed transmission configuration.

Example 41 is the computer-readable medium of any of examples 38 to 40, wherein the code further causes the processor to identify whether uplink transmit (TX) switching is supported for any one or more of the UE-supported frequency bands.

Example 42 is computer-readable medium of any of examples 38 to 41, wherein, when uplink TX switching is supported, the code causes the processor to identify at least one combination of the transmitters to be used for uplink TX switching across one of the UE-supported frequency bands.

Example 43 is the computer-readable medium of any of examples 38-42, wherein the proposed transmission configuration comprises a single MIMO capability indicator specifying a configuration for transmitting the received information over at least one of the UE-supported frequency bands.

Example 44 is the computer-readable medium of any of examples 38-43, wherein the code causes the processor to assign one or more data bits to each of the UE-supported frequency bands using the MIMO capability indicator, the one or more data bits indicating whether the corresponding frequency band is coherent, partially coherent, or non-coherent.

Example 45 is the computer-readable medium of any of examples 38 to 44, wherein, when uplink TX switching is not supported, the code causes the processor to identify each frequency band as coherent to thereby support transmission over the frequency band using at least two independent transmitters of the plurality of transmitters.

Example 46 is the computer-readable medium of any of examples 38 to 45, wherein when uplink transmit (TX) switching is supported, the code further causes the processor to generate a MIMO capability indicator specifying the UE-supported frequency bands and an uplink TX indicator specifying whether each specified frequency band supports uplink TX switching.

Example 47 is the computer-readable medium of any of examples 39 to 46, wherein the code further causes the processor to: generate an indicator specifying, for the UE-supported frequency bands, whether each of the specified frequency bands is coherent, partially coherent or non-coherent; and transmit the received information over each of the frequency bands using a plurality of transmitters.

Example 48 is a computer-readable medium storing computer-executable code, the code when executed by a processor cause the processor to: receive information to be transmitted to a base station; identify multiple-input-multiple-output (MIMO) coherence capability information for at least two UE-supported frequency bands on a per-band and per-band combination basis; identify support for uplink transmit (TX) switching; generate an indicator specifying, for the at-least two frequency bands, whether any of the frequency bands are coherent, partially coherent or non-coherent; determine a proposed transmission configuration based on the MIMO capability information and the uplink TX switching for at least one of the UE-supported frequency bands; and report, to the base station, the proposed transmission configuration.

Example 49 is the computer-readable medium of examples 48, wherein the code causes the processor to generate a separate indicator for each of the UE-supported frequency bands, the separate indicator further specifying whether the frequency band is coherent, partially coherent or non-coherent.

Example 50 is the computer-readable medium of examples 48 and 49, wherein the code causes the processor to transmit the received information to the base station.

What is claimed is:

1. A method for wireless communication at a user equipment (UE), comprising:

receiving information to be transmitted to a base station;

identifying multiple-input-multiple-output (MIMO) coherence capability information for at least two UE-supported frequency bands on a per-band and a per-band combination basis;

determining a proposed transmission configuration based on the MIMO capability information; and reporting, to the base station, the proposed transmission configuration.

2. The method of claim 1, further comprising reporting to the base station the MIMO coherence capability information.

3. The method of claim 1, further comprising transmitting the received information using the proposed transmission configuration.

4. The method of claim 1, further comprising identifying whether uplink transmit (TX) switching is supported for any one or more of the UE-supported frequency bands.

5. The method of claim 4, wherein, when uplink TX switching is supported, determining the proposed transmission configuration further comprises identifying at least one combination of the transmitters to be used for uplink TX switching across one of the UE-supported frequency bands.

6. The method of claim 4, wherein, when uplink TX switching is not supported, each frequency band identified as coherent is configured to support transmission over at least two independent transmitters of the plurality of transmitters.

7. The method of claim 1, wherein the proposed transmission configuration comprises a single MIMO capability indicator specifying a configuration for transmitting the received information over at least one of the UE-supported frequency bands.

8. The method of claim 1, wherein determining the proposed transmission configuration comprises using the MIMO capability indicator to assign one or more data bits to each of the UE-supported frequency bands, the one or more data bits indicating whether the corresponding frequency band is coherent, partially coherent, or non-coherent.

9. The method of claim 1, wherein when uplink transmit (TX) switching is supported, determining the proposed transmission configuration comprises providing a MIMO capability indicator specifying the UE-supported frequency bands and an uplink TX indicator specifying whether each specified frequency band supports uplink TX switching.

10. The method of claim 1 wherein:

determining the proposed transmission configuration comprises providing an indicator specifying, for the UE-supported frequency bands, whether each of the specified frequency bands is coherent, partially coherent or non-coherent; and each of the specified bands is configured to transmit the received information using a plurality of transmitters.

11. A method for wireless communication at a user equipment (UE), comprising:

receiving information to be transmitted to a base station;

identifying multiple-input-multiple-output (MIMO) coherence capability information for at least two UE-supported frequency bands on a per-band and per-band combination basis;

identifying support for uplink transmit (TX) switching;

providing an indicator specifying, for the at-least two frequency bands, whether any of the frequency bands are coherent, partially coherent or non-coherent;

determining a proposed transmission configuration based on the MIMO capability information and the uplink TX switching for at least one of the UE-supported frequency bands; and reporting, to the base station, the proposed transmission configuration.

12. The method of claim 11, wherein a separate indicator is provided for each of the UE-supported frequency bands, the separate indicator further specifying whether the frequency band is coherent, partially coherent or non-coherent.

13. The method of claim 11, further comprising transmitting the received information to the base station.

14. An apparatus for wireless communications, comprising:

a memory; and a plurality of transmitters for each of at least two UE-supported frequency bands, the plurality of transmitters capable when configured of coherently transmitting information over the respective frequency band; and at least one processor coupled to the memory and configured to:

receive information to be transmitted to a base station;

identify multiple-input-multiple-output (MIMO) coherence capability information for the UE-supported frequency bands on a per-band and a per-band combination basis;

determine a proposed transmission configuration based on the MIMO capability information; and report, to the base station, the proposed transmission configuration.

15. The apparatus of claim 14, wherein the at least one processor is further configured to report to the base station the MIMO coherence capability information.

16. The apparatus of claim 14, wherein the at least one processor is further configured to transmit the received information using the proposed transmission configuration.

17. The apparatus of claim 14, wherein the at least one processor is further configured to identify whether uplink transmit (TX) switching is supported for any one or more of the UE-supported frequency bands.

18. The apparatus of claim 17, wherein, when uplink TX switching is supported, the at least one processor is further configured to identify at least one combination of the transmitters to be used for uplink TX switching across one of the UE-supported frequency bands.

19. The apparatus of claim 17, wherein, when uplink TX switching is not supported, the at least one controller is further configured to identify each frequency band as coherent to thereby support transmission over the frequency band using at least two independent transmitters of the plurality of transmitters.

20. The apparatus of claim 14, wherein the proposed transmission configuration comprises a single MIMO capability indicator specifying a configuration for transmitting the received information over at least one of the UE-supported frequency bands.

21. The apparatus of claim 14, wherein the at least one controller is further configured to assign one or more data bits to each of the UE-supported frequency bands using the MIMO capability indicator, the one or more data bits indicating whether the corresponding frequency band is coherent, partially coherent, or non-coherent.

22. The apparatus of claim 14, wherein when uplink transmit (TX) switching is supported, the at least one processor is further configured to generate a MIMO capability indicator specifying the UE-supported frequency bands and an uplink TX indicator specifying whether each specified frequency band supports uplink TX switching.

23. The apparatus of claim 14, wherein the at least one processor is further configured to:

generate an indicator specifying, for the UE-supported frequency bands, whether each of the specified frequency bands is coherent, partially coherent or non-coherent; and transmit the received information over each of the frequency bands using a plurality of transmitters.

24. An apparatus for wireless communications, comprising:

a memory;

a plurality of transmitters for at least two UE-supported frequency bands; and at least one processor coupled to the memory and configured to:

receive information to be transmitted to a base station;

identify multiple-input-multiple-output (MIMO) coherence capability information for at least two UE-supported frequency bands on a per-band and per-band combination basis;

identify support for uplink transmit (TX) switching;

generate an indicator specifying, for the at-least two frequency bands, whether any of the frequency bands are coherent, partially coherent or non-coherent;

determine a proposed transmission configuration based on the MIMO capability information and the uplink TX switching for at least one of the UE-supported frequency bands; and report, to the base station, the proposed transmission configuration.

25. The apparatus of claim 24, wherein the at least one processor is further configured to generate a separate indicator for each of the UE-supported frequency bands, the separate indicator further specifying whether the frequency band is coherent, partially coherent or non-coherent.

26. The apparatus of claim 24, wherein the at least one processor is further configured to transmit the received information to the base station.

* * * * *